United States Patent
Schwartz et al.

(10) Patent No.: US 7,055,962 B2
(45) Date of Patent: Jun. 6, 2006

(54) SYSTEM AND METHOD FOR MANAGING PROJECTOR BULB LIFE

(75) Inventors: Howell Schwartz, Austin, TX (US); Samuel Nicklaus D'Alessio, Round Rock, TX (US); Subramanian Jayaram, Austin, TX (US); Harold Guy Melton, Round Rock, TX (US); Stanley Osgood, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/719,157

(22) Filed: Nov. 21, 2003

(65) Prior Publication Data

US 2005/0110958 A1    May 26, 2005

(51) Int. Cl.
 G03B 21/20 (2006.01)
 H05B 37/02 (2006.01)
 H05B 39/04 (2006.01)
 H05B 41/36 (2006.01)
 G01R 31/00 (2006.01)
 G02F 1/00 (2006.01)
 H04N 5/74 (2006.01)

(52) U.S. Cl. ............... 353/85; 315/224; 315/291; 324/414; 348/771

(58) Field of Classification Search ............ 353/85–87, 353/52, 122, 20, 30, 31, 98, 99; 315/224, 315/248, 291, 307, 326, 344, 360; 348/744, 348/745, 759, 771; 362/317, 341, 346; 313/620, 313/634; 324/403, 414
See application file for complete search history.

(56) References Cited

U.S. PATENT DOCUMENTS

| | | | |
|---|---|---|---|
| 5,469,027 A * | 11/1995 | Uchihashi et al. | 315/224 |
| 5,669,686 A | 9/1997 | Moon | 353/98 |
| 6,089,740 A * | 7/2000 | Forehand et al. | 362/573 |
| 6,520,648 B1 * | 2/2003 | Stark et al. | 353/85 |
| 6,637,893 B1 * | 10/2003 | Hecht | 353/85 |
| 6,779,896 B1 * | 8/2004 | Luerkens et al. | 353/84 |
| 2005/0077841 A1 * | 4/2005 | Lurkens et al. | 315/308 |

* cited by examiner

Primary Examiner—W. B. Perkey
Assistant Examiner—Rochelle Blackman
(74) Attorney, Agent, or Firm—Hamilton & Terrile, LLP; Robert W. Holland

(57) ABSTRACT

Projector bulb life is managed to achieve desired performance parameters, such as a maximum life mode or maximum brightness mode, by sensing bulb luminance and applied the sensed luminance with a luminance feedback controller to drive the bulb to achieve the desired performance parameter. For instance, in maximum life mode the luminance feedback controller reduces power applied to the bulb to restrict bulb luminance to a maximum luminance setpoint when greater luminance is available with a newer bulb. In maximum brightness mode, the luminance feedback controller increases power applied to the bulb to increase bulb luminance if the sensor senses luminance below a threshold due bulb wear. Bulb life management improves project image illumination to display information in a variety of projector types, including digital mirror devices and liquid crystal displays.

4 Claims, 4 Drawing Sheets

SYSTEM AND METHOD FOR MANAGING PROJECTOR BULB LIFE

BACKGROUND OF THE INVENTION

1. Field of the Invention

The present invention relates in general to the field of information display, and more particularly relates to a system and method for managing projector bulb life.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Often a primary objective of information handling systems is the display of information to users as an image. Conventionally information has been displayed with cathode ray tube (CRT) devices that generally direct an electron beam towards phosphors located in a screen to form images of the information for viewing by users. CRT devices typically apply chroma feedback to control electrical drive signals and thus manage the quality of images generated by the impact of electrons on the phosphor screen. However, obtaining high resolution images from CRT displays is difficult and often involves the use of bulky devices with relatively high power consumption. Primarily as a result of the generally large size of CRT devices, consumers have turned to projector devices for the display of information images. Generally, projector devices display information by illuminating an image with high intensity light to present the image on a screen. For instance, digital mirror device (DMD) projectors, also known as digital light processor (DLP) projectors, direct high intensity light at an image generator having a large number of miniature mirrors that selectively direct the light at a screen to form an image. Another example of a projector device is a liquid crystal device (LCD or LCOS) projector that directs high intensity light through a LCD screen having the desired image which is then projected onto a screen.

Projector devices have substantially improved the display of information compared with CRT devices by providing better resolution with larger images so that consumers have turned to projector devices with increased frequency. For instance, graphics projectors initially developed to make presentations with applications running on portable information handling systems have now become a common selection for home theaters that show DVD movies. Similarly, DMD and LCD projectors have become an increasingly common selection for consumer television sets. One difficulty that remains with consumer acceptance of projector display devices is that the projector bulbs typically used in projector devices are expensive ultra high pressure mercury vapor or xenon halogen lamps that have a generally short life span of approximately 1500 hours. Consumers are hesitant to invest in projector display devices for common home entertainment use where the projector display devices require frequent replacement of expensive bulbs. Consumers are also hesitant to invest in projector display devices that have perceived performance problems, such as decreased available brightness as a projector bulb ages. As a bulb ages, the arc gap of the bulb increases so that a greater voltage is required to generate the same level of luminance from the bulb. Eventually, the arc gap increases to a distance that results in reduced brightness to half or less of a bulb's original brightness so that the consumer has to replace the bulb with a new bulb to obtain acceptable brightness performance.

SUMMARY OF THE INVENTION

Therefore a need has arisen for a system and method which manages projector bulb output parameters in order to obtain desired brightness and length of life performance.

In accordance with the present invention, a method and system are provided which substantially reduce the disadvantages and problems associated with previous methods and systems for managing a projector bulb life. A luminance feed back control loop senses luminance output by a projector bulb and provides a control signal to the projector bulb's power driver to maintain brightness output from the bulb so that the bulb has a desired performance, such as maximum life or maximum brightness over the bulb's life.

More specifically, a bulb is illuminated by a power driver that provides variable power to the bulb to generate variable brightness to illuminate information formed as an image, such as with a DMD or LCD display device. Bulb brightness is sensed by a luminance sensor and provided to a luminance feedback controller as a sense signal, such as a voltage. The luminance controller generates an error control signal that is fed back to the power driver to compensate for changes in bulb performance over time, such as arc length induced bulb brightness changes related to bulb aging. The luminance controller manages bulb luminance to obtain desired bulb performance parameters. In a maximum life mode, the luminance controller restricts bulb brightness to a threshold value by reducing the power provided to the bulb so that a new bulb with greater available brightness illuminates at a lower brightness level to reduce wear on the bulb. In a maximum brightness mode, the luminance controller increases bulb brightness to a threshold value by increasing power provided to the bulb so that an older bulb with degraded available brightness illuminates at a greater brightness level. In an unmanaged mode, the luminance controller is disengaged to allow a user to manually select a desired brightness.

The present invention provides a number of important technical advantages. One example of an important technical advantage is that consumers are presented with an information image from a projector with improved consistency in the brightness of the image. Consumers are provided with improved life of a projector's bulb and face reduced cost in the replacement of projector bulbs through the control of the power that drives a bulb based on feedback of the luminance output by the bulb. The control algorithm allows a user to select between bulb performance goals so that the user can have maximum available illumination from a new bulb or initially reduced illumination below a bulb's maximum available brightness as a tradeoff for longer bulb life and improved performance from the bulb as the bulb ages.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Projector bulb life management enhances the display of information, such as that generated by an information handling system, by illuminating an image having the information with a luminance designed to achieve desired bulb performance parameters, such as maximized life or maximized brightness over the life of a bulb. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
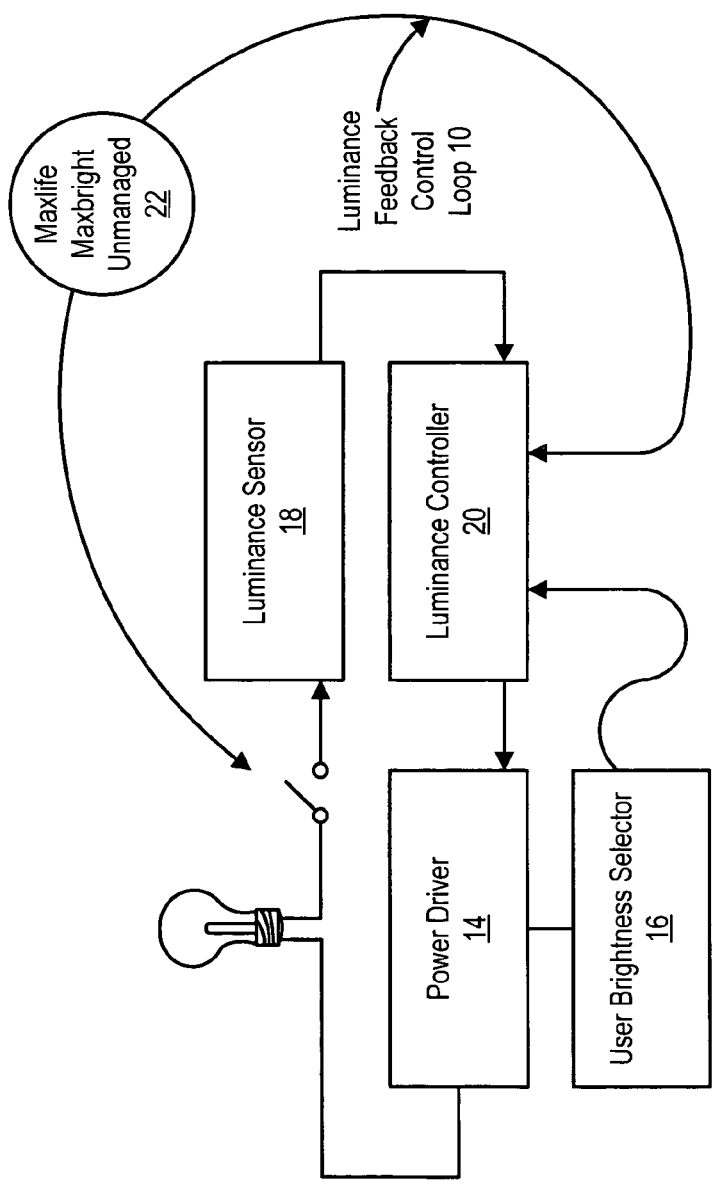
FIG. 1 depicts a block diagram of a luminance feedback controller.

Referring now to FIG. 1, a block diagram depicts a luminance feedback control loop 10 operable to achieve desired projector bulb performance parameters, such as maximized bulb life or maximized bulb brightness. A projector bulb 12 provides illumination for display of information based on the level of power provided by a power driver 14. Brightness for bulb 12 is selectable by a user through a user brightness selector 16, which manually controls the power applied to bulb 12 by power driver 14. A luminance sensor 18 is disposed proximate to bulb 12 to sense the luminance provided by bulb 12 and output a sense signal proportional to the sensed luminance, such as a voltage provided by a voltage converter circuit. The voltage output by luminance sensor 18 is compared with a setpoint voltage by luminance controller 20 to generate a difference signal amplified as an error signal and fed back to power driver 14 in a closed-loop feedback form. The voltage output to bulb 12 by power driver 14 is thus increased or decreased depending on the sign and magnitude of the error signal from luminance controller 20. Luminance controller 20 applies a control algorithm to provide a desired projection bulb luminance that achieves a desired projection bulb performance parameter, such as maximum life or maximum brightness over the life of bulb 12. In alternative embodiments, other feedback signals may be used, such as current, duty cycle or other lamp-input parameters that define a control error correction signal.

Luminance controller 20 alters the power applied to bulb 12 by power driver 14 to compensate for changes in bulb luminance over a bulb's life. Generally, error correction signals impact bulb luminance output when user brightness selector 16 calls for a high brightness that is close to or at the maximum brightness of bulb 12. With newer bulbs, luminance controller 20 tends to decrease the output of power driver 14 so that luminance output by bulb 12 decreases in a tradeoff that increases the overall life of bulb 12. With older bulbs, luminance controller 20 tends to increase the output of power driver 14 so that luminance output by bulb 12 increases in a tradeoff that decreases the remaining life of bulb 12. The error signal correction provided by luminance controller 20 depends in part on the type of projector bulb performance parameter selected by a user through a selector switch 22. In a maximum life position, luminance controller 20 applies an algorithm that restricts power applied from power driver 14 so that sensed luminance does not exceed a threshold value. In a maximum brightness position, luminance controller 20 applies an algorithm that increases power applied from power driver 14 so that sensed luminance does not fall below a threshold value when a user has selected a brightness setting of greater than a predetermined intensity. In an unmanaged position, the switch opens to disengage luminance controller 20 from management of bulb 12.

Figure 2:
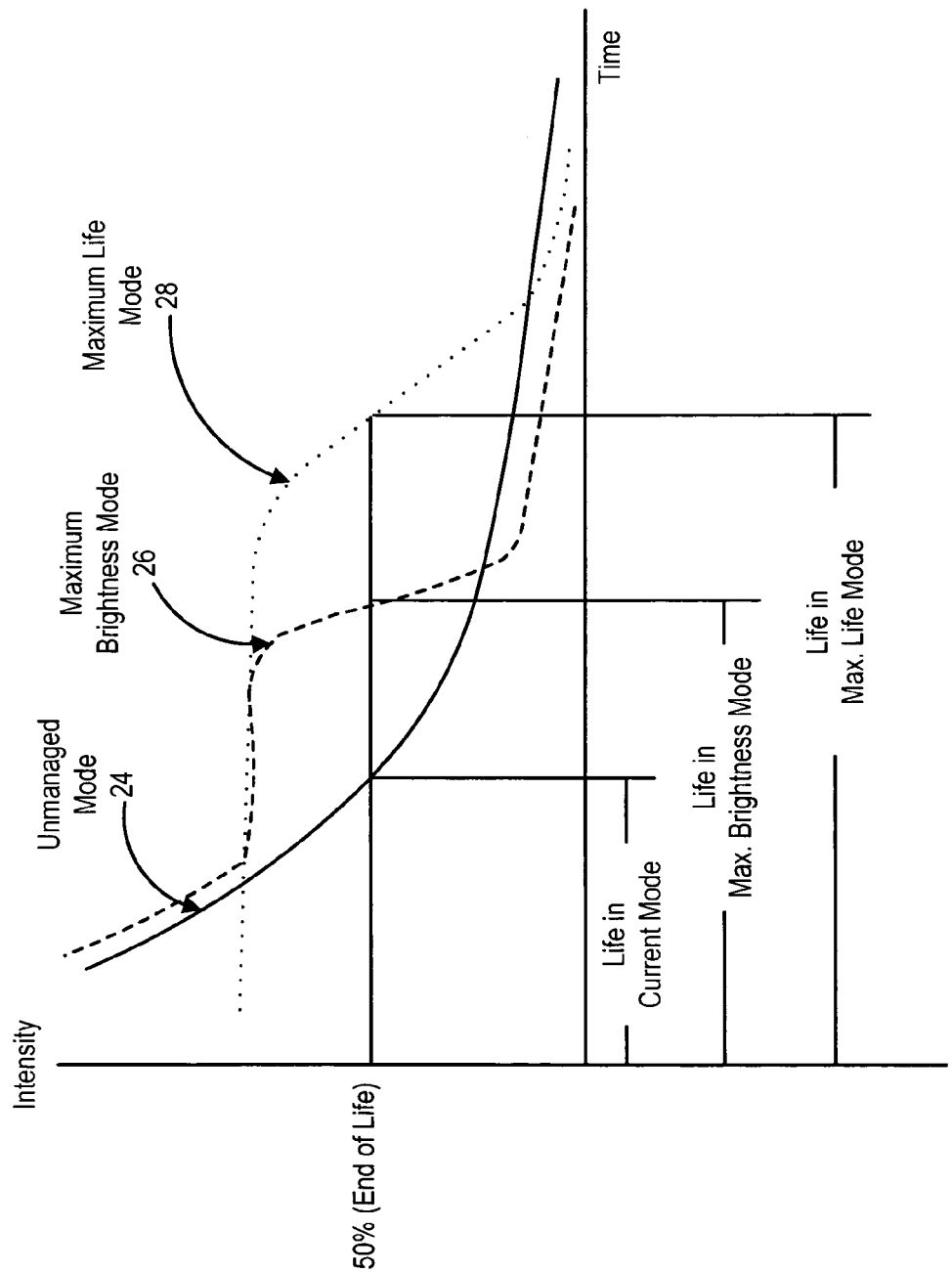
FIG. 2 depicts a graph of examples of projector bulb performance parameters.

Referring now to FIG. 2, a graph compares projector bulb performance with maximum life, maximum brightness and unmanaged luminance feedback modes. Solid line 24 depicts expected luminance performance of an unmanaged bulb from an initial high intensity to an end of life intensity of approximately 50% of the initial intensity. Dashed line 26 depicts managed luminance performance of a bulb to achieve maximum brightness over the life of the bulb. Initially, luminance controller 20 allows the bulb to provide the same luminance intensity as in the unmanaged mode. However, when the luminance intensity reaches a setpoint value, luminance controller 20 provides an error correction control signal that increases the output of power driver 14 so that the luminance sensed with luminance sensor 18 is maintained substantially at the setpoint value for the life of the bulb. Dotted line 28 depicts managed luminance performance of a bulb to achieve maximum life. In the maximum life mode, luminance controller 20 provides an error correction control signal that restricts the output of power driver 14 so that the luminance sensed with luminance sensor 18 does not exceed a setpoint value that is substantially lower than the unmanaged maximum luminance intensity of the bulb. By initially driving a new bulb less hard, the bulb provides the setpoint value for a greater amount of time with luminance controller 20 gradually increasing the output of power driver 14 as the brightness of the light provided by the bulb decreases over time. Both the maximum brightness and maximum life bulb performance control modes obtain bulb luminance output greater than the 50% end-of-life level for longer time periods by forcing greater power through the bulb as the bulb wears over time. In the embodiment depicted by FIG. 2, the maximum brightness and maximum life intensity setpoints are substantially equal, although in alternative embodiments optimized brightness and life for different types of bulbs may be achieved with different setpoints for each mode and various thresholds around each setpoint.

Figure 3:
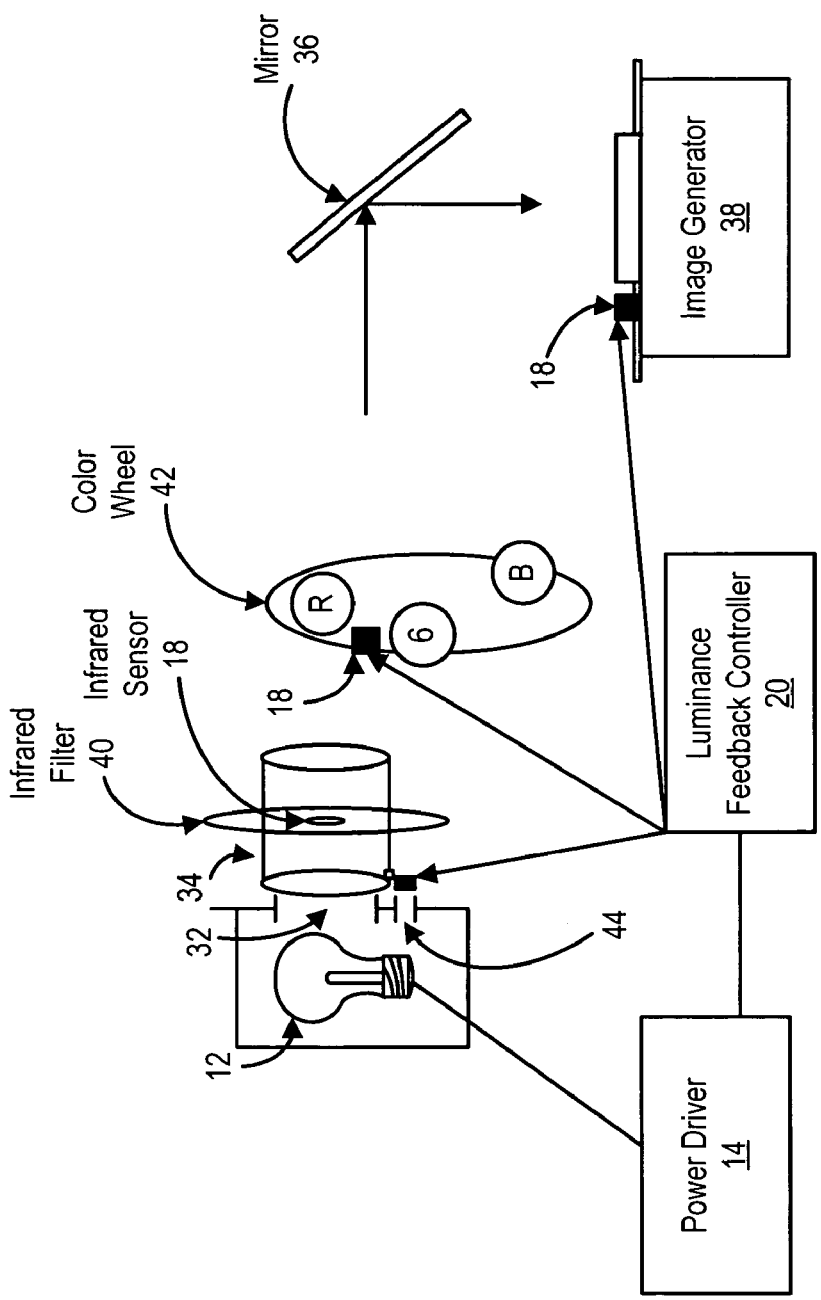
FIG. 3 depicts a digital mirror device configured manage bulb performance parameters.
Figure 4:
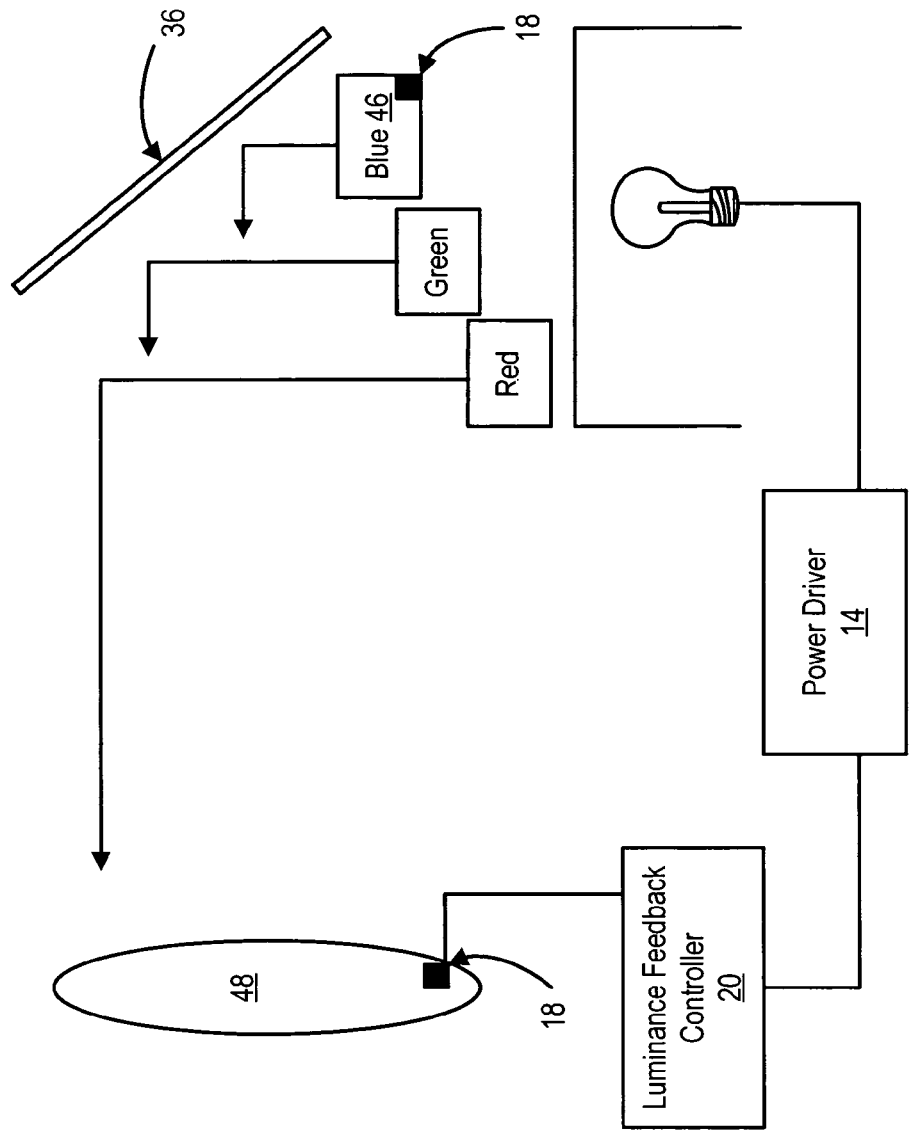
FIG. 4 depicts a liquid crystal display configured to manage bulb performance parameters.

Referring now to FIG. 3, a digital mirror device 30 is depicted configured to manage bulb performance parameters with luminance feedback controller 20. Bulb 12 sends light through a main aperture 32 and into a columnator 34 that directs the light via a mirror 36 to an image generator 38. An infrared filter 40 filters out infrared light and a color wheel 42 spins to provide red, green and blue light to image generator 38. The intensity of the brightness of bulb 12 is determined by the power provided from power driver 14 as corrected with the control signal from luminance feedback controller 20 in order to provide a desired bulb performance, such as maximum life or maximum brightness. Luminance feedback controller generates its error control signal based on sensed luminance of bulb 12 taken from one or more luminance sensors disposed along the path of the light provided by bulb 12. One luminance sense location is provided with a second aperture 44 formed near bulb 12 or in columnator 34. Other luminance sense locations are provided by measuring the level of infrared light filtered at infrared filter 40, measuring the level of light that impacts color wheel 42, or measuring the light that leaks at mirrors associated with image generator 38. In alternative types of projectors, alternative locations for light sensors may be selected. For instance, as is depicted by FIG. 4, a liquid crystal display projector has luminance sensors located at a blue light filter 46 or at the liquid crystal display 48 that generates the image for display of desired information.

Although the present invention has been described in detail, it should be understood that various changes, substitutions and alterations can be made hereto without departing from the spirit and scope of the invention as defined by the appended claims.

What is claimed is:

1. A projector for display of information, the projector comprising:
   an image operable to display the information;
   a bulb operable to provide light to illuminate the image;
   a power driver interfaced with the bulb and operable to provide selectable variable power to illuminate the image with selectable variable luminance;
   a luminance sensor disposed to sense the luminance of the bulb;
   a luminance feedback controller interface with the power driver and the luminance sensor, the luminance feedback controller operable to control power applied by the power driver according to the luminance sensed by the luminance sensor to achieve a predetermined bulb parameter; and
   a switch interfaced with the luminance feedback controller and operable to disengage control by the luminance feedback controller of the power driver.

2. The projector of claim 1 wherein the luminance feedback controller achieves a desired bulb life by limiting power applied by the power driver to restrict luminance sensed by the luminance sensor at or below a predetermined setpoint.

3. The projector of claim 2 wherein the luminance feedback controller achieves a desired maximum available luminance from the bulb by increasing power applied by the power driver to increase luminance sensed by the luminance sensor at or above a predetermined setpoint when the selected luminance exceeds a predetermined level.

4. The projector of claim 2 wherein the image comprises output of a digital mirror device.

* * * * *